(12) United States Patent
Scott

(10) Patent No.: US 6,449,867 B1
(45) Date of Patent: Sep. 17, 2002

(54) APPARATUS AND METHOD FOR MEASURING A DIMENSION OF A WORKPIECE

(75) Inventor: David G. Scott, Forest Park, IL (US)

(73) Assignee: Tru-Grind, Inc., Palatine, IL (US)

( * ) Notice: Subject to any disclaimer, the term of this patent is extended or adjusted under 35 U.S.C. 154(b) by 0 days.

(21) Appl. No.: 09/523,546

(22) Filed: Mar. 10, 2000

Related U.S. Application Data

(60) Provisional application No. 60/125,091, filed on Mar. 11, 1999.

(51) Int. Cl.[7] ................................................. G01B 5/02
(52) U.S. Cl. .......................................... 33/832; 33/549
(58) Field of Search ........................ 33/832, 833, 712, 33/545, 546, 547, 549, 555

(56) References Cited

U.S. PATENT DOCUMENTS

| | | | | |
|---|---|---|---|---|
| 2,763,934 A | * | 9/1956 | Creek et al. | 33/549 |
| 2,835,040 A | * | 5/1958 | D'Elia | 33/549 |
| 3,975,829 A | * | 8/1976 | Possati | 33/549 |
| 4,679,330 A | * | 7/1987 | Williams | 33/832 |
| 5,220,730 A | * | 6/1993 | Cangelosi | 33/549 |
| 5,353,516 A | * | 10/1994 | Dalton | 33/833 |

* cited by examiner

Primary Examiner—Christopher W. Fulton
(74) Attorney, Agent, or Firm—Pauley Petersen Kinne & Erickson

(57) ABSTRACT

An apparatus for measuring a dimension of a workpiece includes a pair of rods positioned within a channel of a baseplate. At least one wedge member is mounted between the rods and forces the rods in a direction away from each other. A guide plate is adjustably mounted with respect to the baseplate, the guide plate having a cutout positioned at least partially over the rods for accepting the workpiece. A measuring tool is adjustably mounted with respect to the baseplate for moving in at least a linear direction.

13 Claims, 7 Drawing Sheets

APPARATUS AND METHOD FOR MEASURING A DIMENSION OF A WORKPIECE

This application claims benefit of Provisional Appln. Ser. No. 60/125,091 filed Mar. 11, 1999.

BACKGROUND OF THE INVENTION

1. Field of the Invention

This invention relates to an apparatus and a method for precision measuring a dimension, preferably but not necessarily a length, of a workpiece or a portion of the workpiece.

2. Description of Related Art

Precision measurements require a predictable, consistent surface across which to take such measurements. Traditionally, granite or other similar surfaces have been used as a base or platform upon which to measure dimensions of a workpiece.

It is desirable to provide an apparatus and method for precision measuring a dimension of a workpiece wherein a predictable, consistent surface is maintained upon which to position the workpiece.

SUMMARY OF THE INVENTION

It is one object of this invention to provide a predictable, consistent surface upon which to position a workpiece.

It is another object of this invention to provide an apparatus wherein a pair of rods maintain a precise surface when engaged within a channel.

It is still another object of this invention to provide guide plate having a cutout for positioning a workpiece upon a precise surface created by a pair of rods.

An apparatus according to one preferred embodiment of this invention includes a base, a baseplate, a guide plate and mounting brackets. The baseplate is preferably fixed with respect to the base. The baseplate comprises a channel. Preferably, but not necessarily, a micrometer or other measuring device is mounted so that a point of contact of the measuring device intersects a centerline of the channel.

Preferably, a rod is fixedly mounted within each corner area of the channel. A wedge member, such as a screw having a tapered head is tightened to effectively force each rod downward and outward, so that each rod establishes linear contact with the baseplate. Two or more wedge members, such as screws, are preferably used to mount the two rods within the channel.

Preferably, a guide plate is slidably mounted with respect to the baseplate. The guide plate has two generally parallel channels through which an adjustment screw can be positioned to facilitate adjustment between the guide plate is and the baseplate.

The guide plate preferably includes a cutout for accommodating a workpiece. The workpiece is positioned within the cutout and rests upon the rods. As the workpiece and/or the guide plate is moved with respect to the baseplate, dimensions may be taken with the measuring device. Such an arrangement results in a predictable, consistent surface upon which to position the workpiece.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
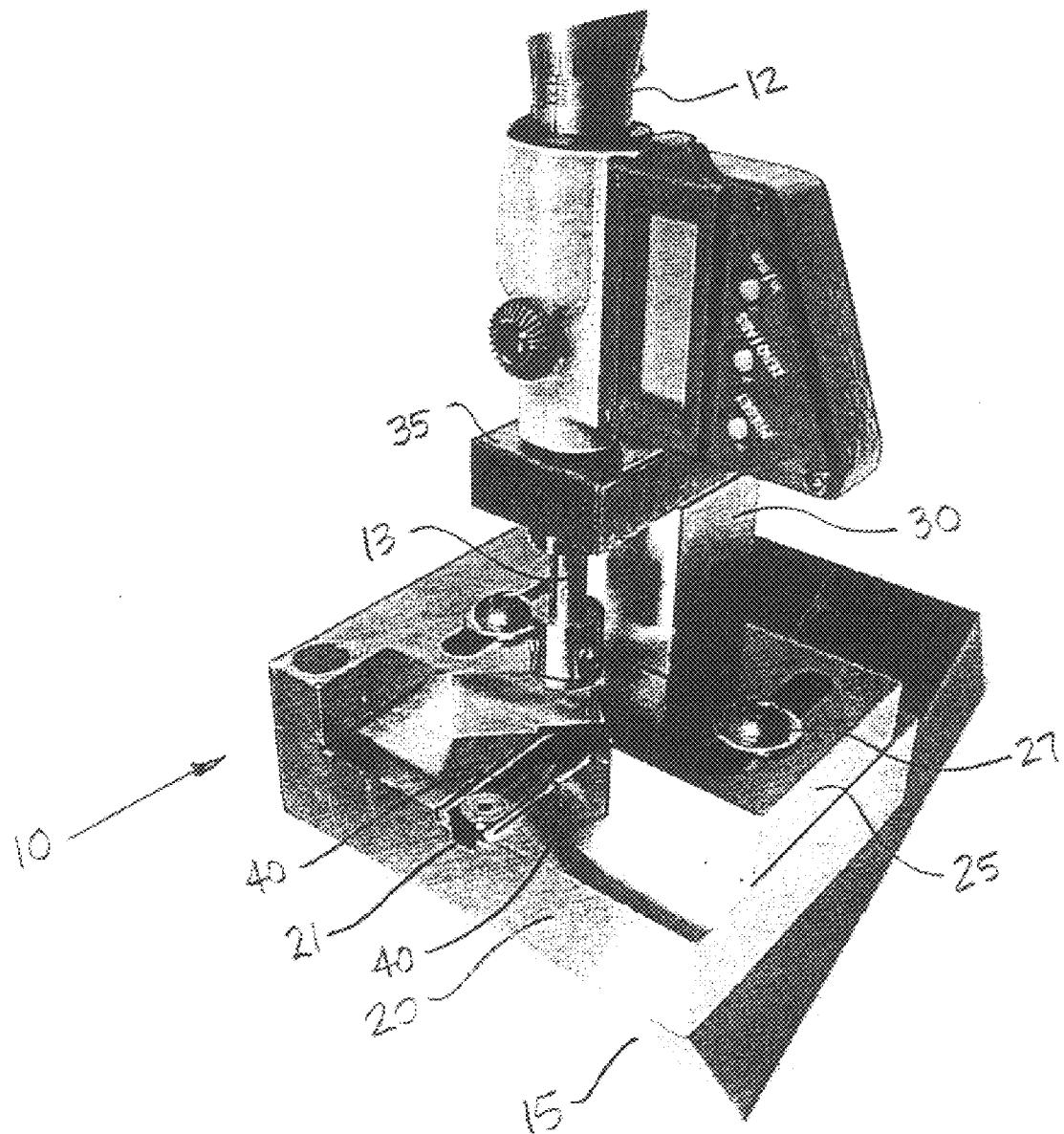
FIG. 1 is a front perspective view of an apparatus, including a base and a baseplate, according to one preferred embodiment of this invention.
Figure 2:
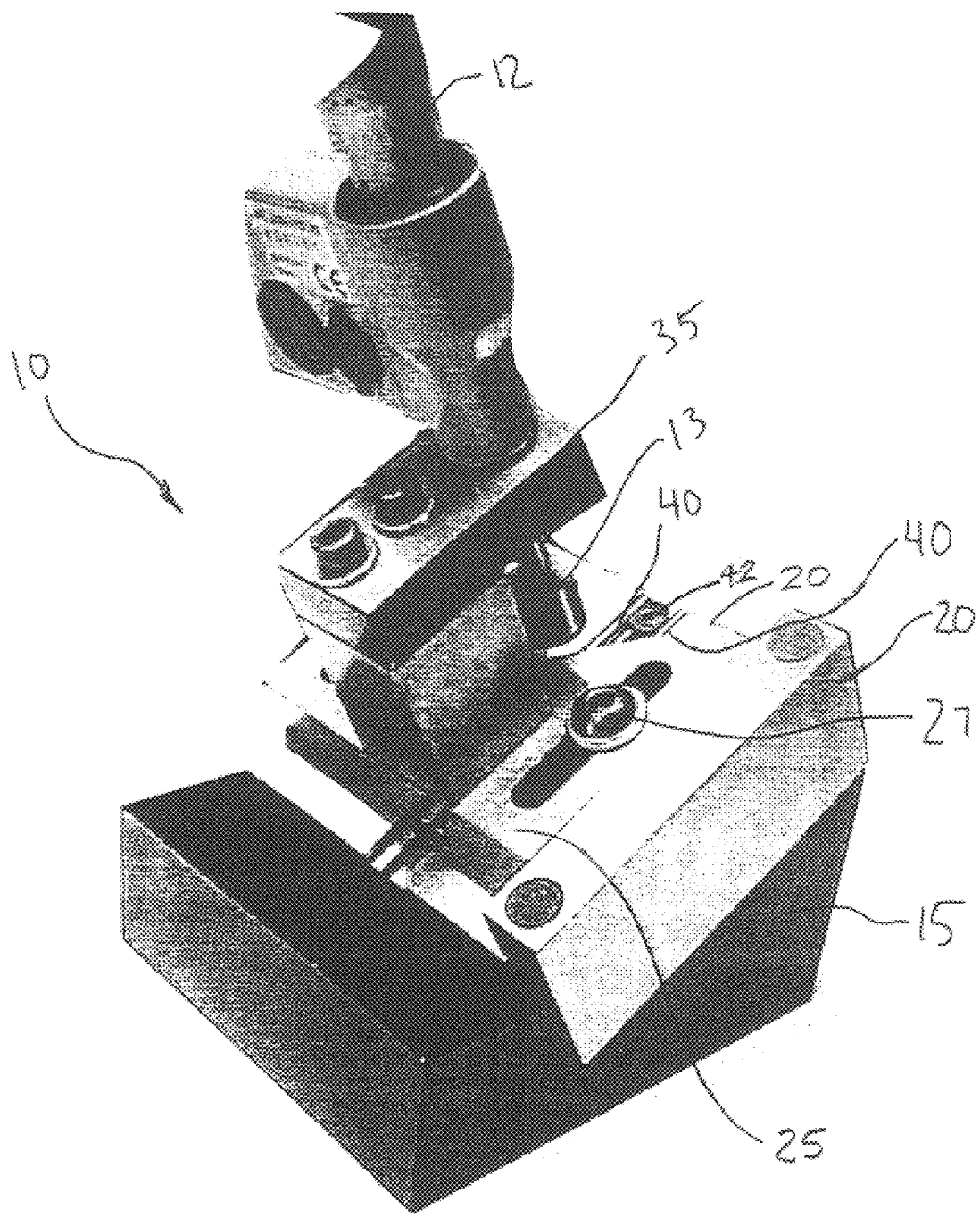
FIG. 2 is a side perspective view of the apparatus shown in FIG. 1.

FIGS. 1 and 2 each show a perspective view from a different upper corner of measuring apparatus 10, according to one preferred embodiment of this invention. FIGS. 1 and 2 show measuring apparatus 10 comprising base 15, baseplate 20, guide plate 25 and mounting brackets 30 and 35.

Preferably, although not necessarily, components of apparatus 10, including base 15, baseplate 20, guide plate 25 and mounting brackets 30 and 35 are constructed from steel, such as A2 steel, having an appropriate hardness, such as approximately 62 Rc. Other appropriate materials known to those having ordinary skill in the art such as carbide steel may also be used provided such materials exhibit high hardness, resist deformation and are workable to precise tolerances.

Figure 3:
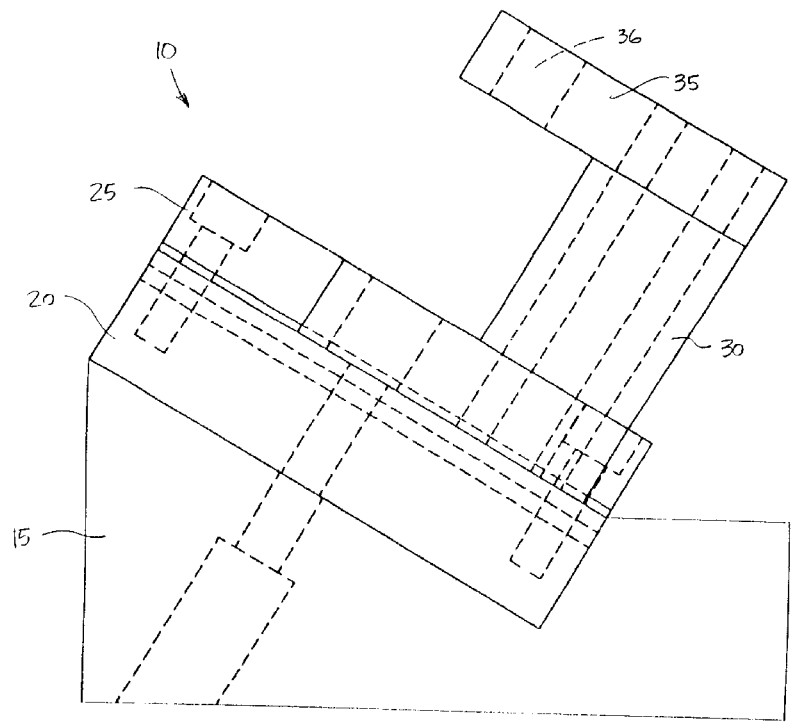
FIG. 3 is a side view of an apparatus, including a base, according to one preferred embodiment of this invention.
Figure 4:
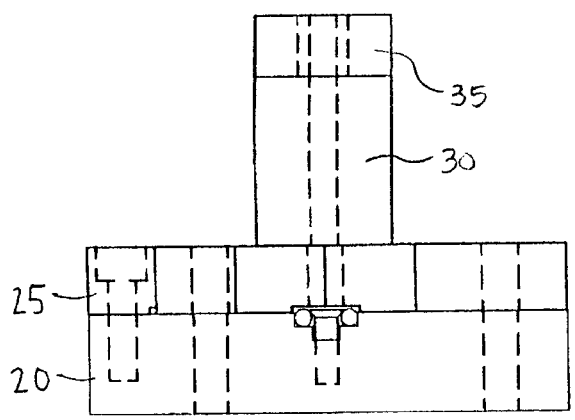
FIG. 4 is a front view of the apparatus shown in FIG. 3 without the base.
Figure 5:
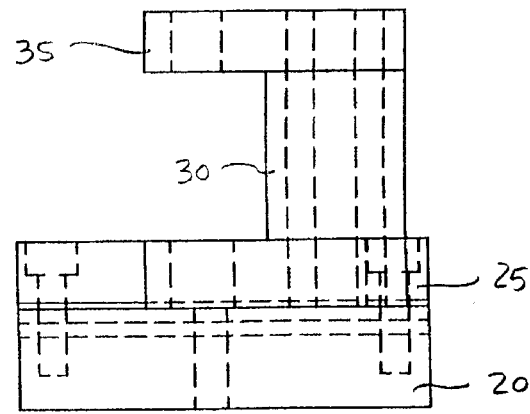
FIG. 5 is a side view of the apparatus shown in FIG. 3 without the base.
Figure 6:
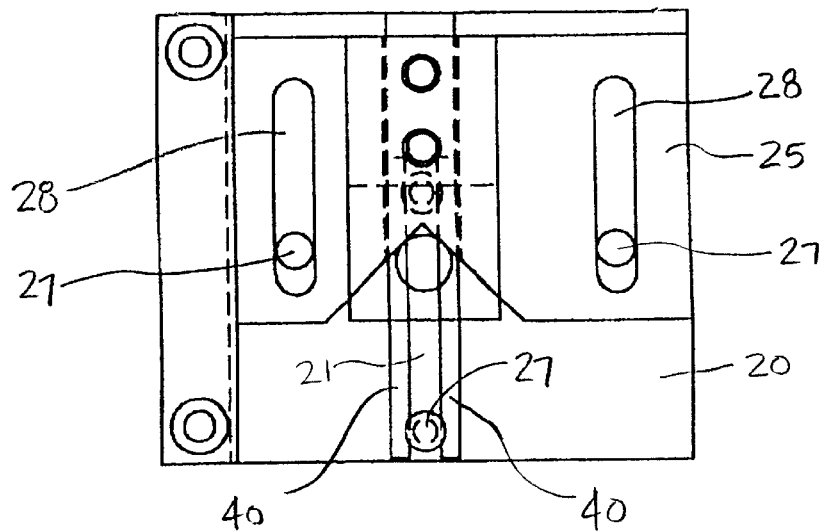
FIG. 6 is a top view of several operative components of an apparatus according to one preferred embodiment of this invention.

In one preferred embodiment of this invention, micrometer 12 is detachably mounted in a fixed position with respect to mounting brackets 30 and 35 and guide plate 25. Micrometer 12 is shown in FIG. 1 as a digital micrometer. However, it is apparent that micrometer 12 can be any other suitable micrometer or measuring device that records a change in a linear direction or a distance traveled in a linear direction. As shown in FIG. 1, measuring shaft 13 of micrometer 12 moves in a linear direction parallel to a longitudinal axis of measuring shaft 13. Micrometer 12 is preferably fixedly mounted within bore 36 of mounting plate 35, as best shown in FIG. 3, in any suitable manner known to those skilled in the art.

Baseplate 20 is preferably fixedly mounted with respect to base 15, such as with fasteners, adhesives, or in any suitable manner known to those skilled in the art. As shown in FIGS.

6–8, according to one preferred embodiment of this invention, baseplate 20 comprises channel 21. Preferably, but not necessarily, micrometer 12 is mounted so that the longitudinal axis of measuring shaft 13 intersects a centerline of channel 21.

Figure 7:
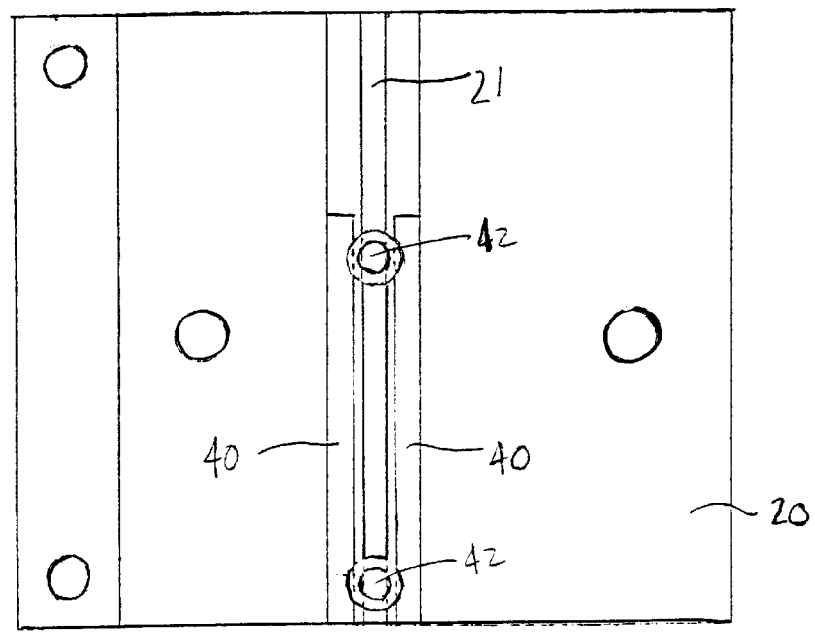
FIG. 7 is a top view of a baseplate according to one preferred embodiment of this invention.
Figure 8:
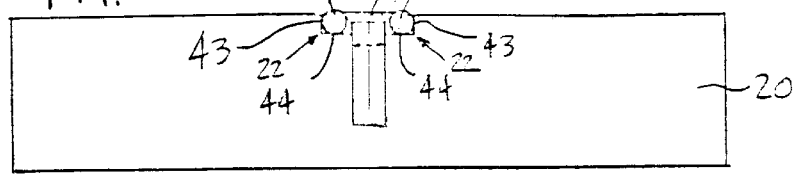
FIG. 8 is a side view of the baseplate shown in FIG. 7.

In one preferred embodiment of this invention, one rod 40 is fixedly mounted within each corner area 22 of channel 21. A wedge member, such as a screw 42 which preferably has a tapered head, such as about 45°, is tightened to effectively force each rod 40 downward and outward, relative to the orientation of FIG. 7, so that each rod 40 establishes linear contact with baseplate 20 at points 43 and 44, as shown in FIG. 8. According to one preferred embodiment of this invention, channel 21 forms a horizontal surface and a vertical surface such that single linear contacts are formed in the horizontal plane and the vertical plane. Two or more wedge members, such as screws 42, are preferably used to mount two rods 40 within channel 21, as shown in FIG. 8. Each rod 40 preferably but not necessarily has a precisely circular cross section, as shown in FIGS. 8, 11, 13 and 14 and is constructed of a relatively hard material, such as a suitable carbide metal.

Figure 13:
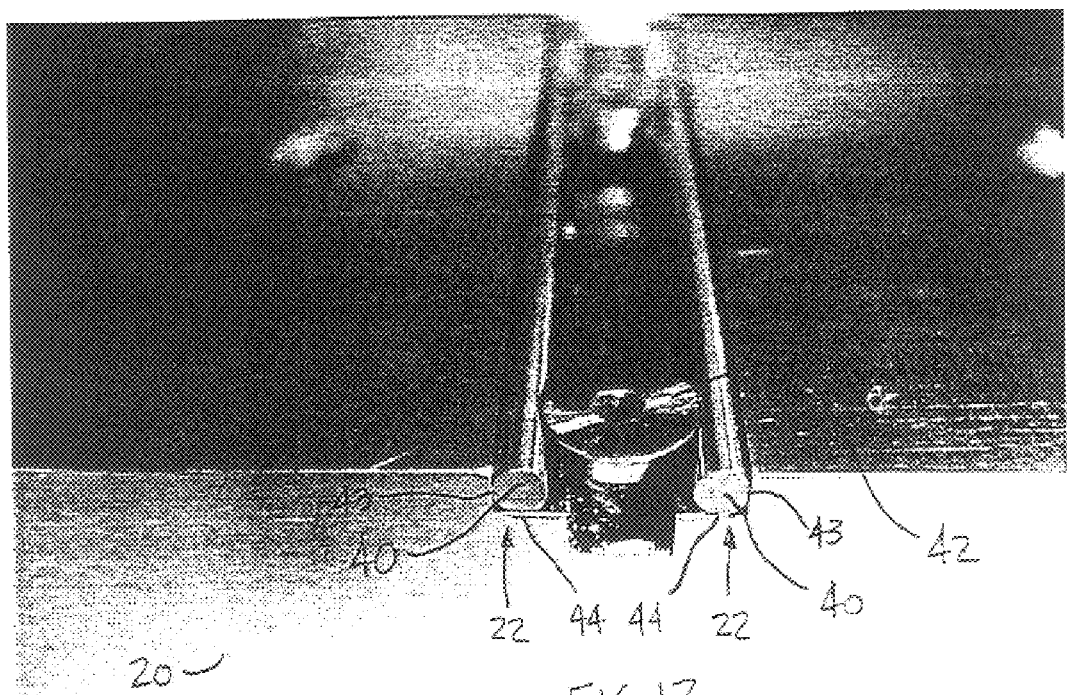
FIG. 13 is a front, close-up perspective view of a baseplate, rods and screw of an apparatus according to one preferred embodiment of this invention.
Figure 14:
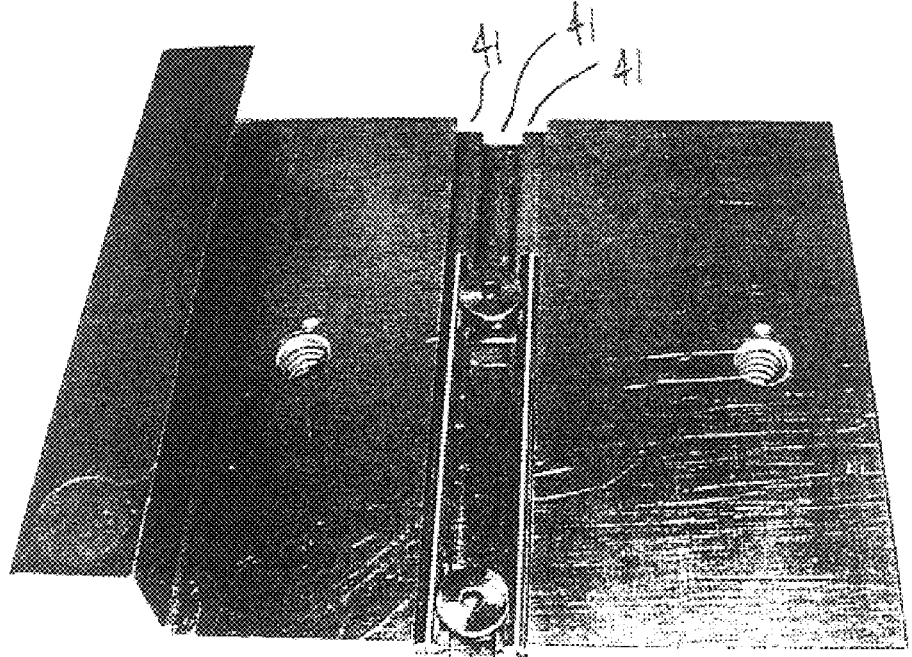
FIG. 14 is a top perspective view of the apparatus shown in FIG. 13.

According to one preferred embodiment of this invention, shown in FIGS. 8 and 13, each rod 40 extends above a planar surface of baseplate 20. Correspondingly, each screw 42 is preferably sunk below an exposed surface of each rod 40.

Figure 9:
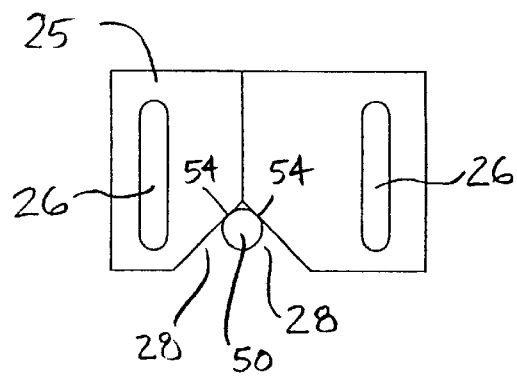
FIG. 9 is a top view of a guide plate according to one preferred embodiment of this invention.
Figure 10:
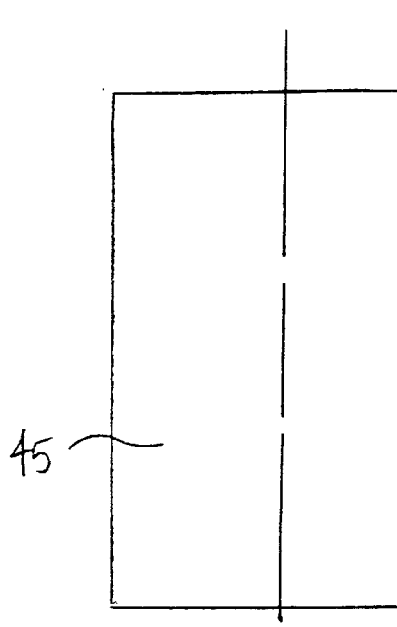
FIG. 10 is a side view of a master blank plug according to one preferred embodiment of this invention.

In one preferred embodiment of this invention, guide plate 25 is slidably mounted with respect to baseplate 20. As shown in FIGS. 1 and 9, for example, guide plate 25 has two generally parallel channels 26 through which adjustment screw 27 or another suitable bolt or fastener can be positioned so that adjustment screw 27 can be engaged within a threaded bore within baseplate 20. As shown in FIGS. 1–5, guide plate 25 is positioned against and slidably contacts baseplate 20. Adjustment screws 27 can be loosened to allow guide plate 25 to slide with respect to baseplate 20 for adjustment, so that all contact areas of rods 40 can be used until spent. Each rod 40 can also be rotated to expose a new contact area and thus further conserve replacement of each rod 40.

Preferably, guide plate 25 slides with respect to baseplate 20 without contacting or interfering with rods 40 or screws 42. Therefore, workpiece 50 and not guide plate 25 makes the only contact with rods 40 above a planar surface of baseplate 20.

A method for measuring workpiece 50, according to one preferred embodiment of this invention, begins with positioning master blank plug 45 within cutout 28 of guide plate 25, as shown in FIG. 13, so that an external surface of master blank plug 45 forms two line contacts with a sidewall of guide plate 25 that forms cutout 28. The line contacts ensure that with the appropriate geometry of cutout 28, such as having a perpendicular cutout and sidewall, the longitudinal axis of master blank plug 45 is parallel to the longitudinal axis of measuring shaft 13. Master blank plug 45 has a known length. With master blank plug 45 positioned within cutout 28, measuring shaft 13 of micrometer 12 is adjusted to contact master blank plug 45, and upon such contact, the readout of micrometer 12 is set to zero.

Figure 11:
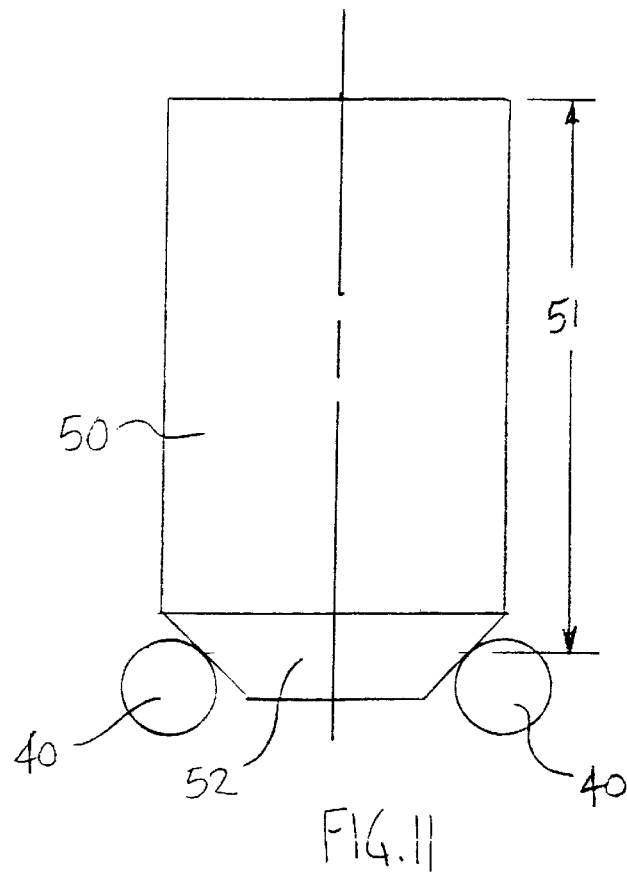
FIG. 11 is a diagrammatical side view of a workpiece positioned on two rods according to one preferred embodiment of this invention.
Figure 12:
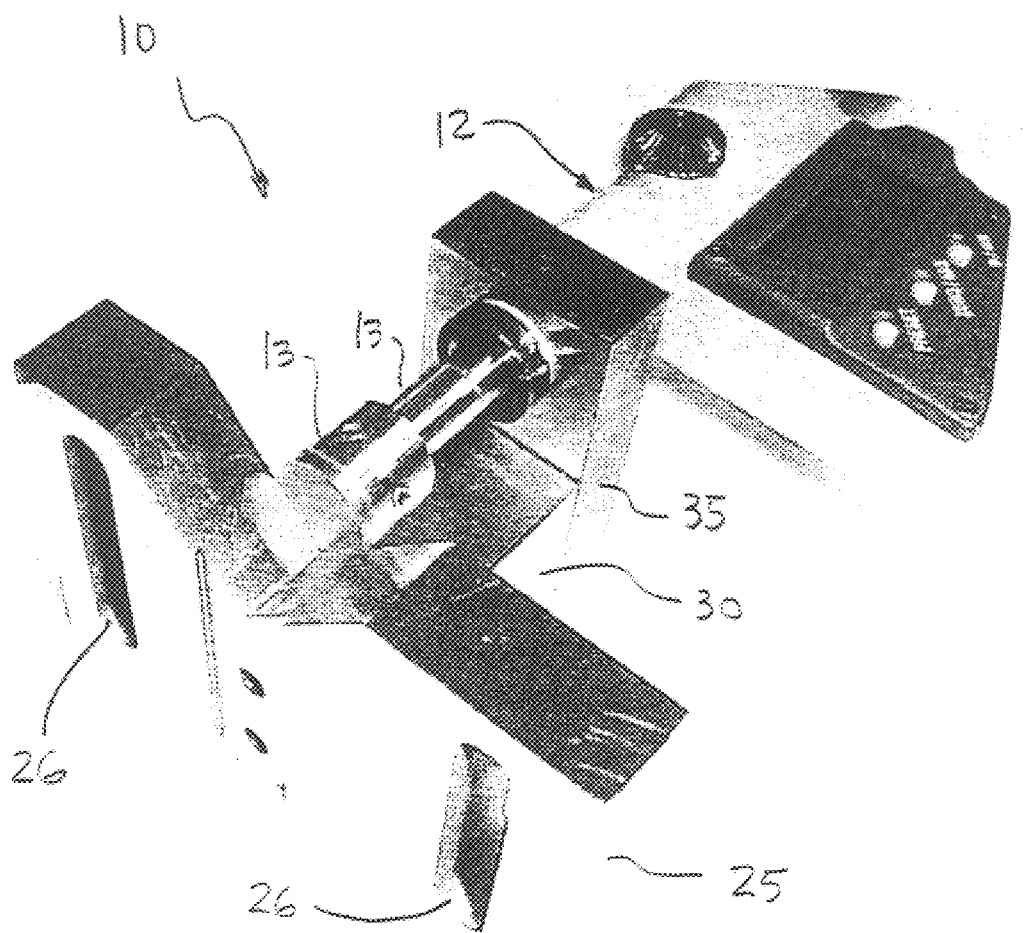
FIG. 12 is a bottom perspective view of the apparatus shown in FIG. 1 without the base or the baseplate.

In one preferred embodiment of this invention, measuring apparatus 10 and the method for measuring are used to determine distance 51 of workpiece 50, as diagrammatically shown in FIG. 11. Distance 51 includes the length of cylindrical portion 53 plus a certain length along the longitudinal axis of workpiece 50 which is perpendicular to contact point 54 on conical portion 52 of workpiece 50. In one preferred embodiment according to this invention, distance 51 is used to determine at which point machining of conical portion 52 is complete. For example, workpiece 50 can be used as a valve plug that operates in a high-pressure fluid system, which requires extremely accurate dimensions on the valve plug seat, conical portion 52.

Workpiece 50 is then positioned within cutout 28 in the same manner as master blank plug 45, but with conical portion 52 contacting the external contact surface of each rod 40, as schematically shown in FIG. 11. Dimension 51 of workpiece 50 can be reduced by further machining of the surface of conical portion 52, until abutting measuring shaft 13 against workpiece 50 results in a zero reading on the readout of micrometer 12.

The diameter of rod 40, the width of channel 21 and/or the depth of channel 21 can be can be varied to achieve different values for dimension 51 of workpiece 50. Geometry and trigonometric functions, known to those having ordinary skill in the art, can be used to calculate the precise position, diameter and/or dimension of any one or more components to accomplish a desired measurement result.

While in the foregoing specification this invention has been described in relation to certain preferred embodiments thereof, and many details have been set forth for purpose of illustration, it will be apparent to those skilled in the art that apparatus 10 and method is susceptible to additional embodiments and that certain of the details described herein can be varied considerably without departing from the basic principles of the invention.

I claim:

1. An apparatus for measuring a dimension of a workpiece, the apparatus comprising:
    a baseplate, the baseplate having a channel, two rods mounted within the channel and spaced apart from each other, at least one wedge member mounted between and forcing the rods in a direction away from each other;
    a guide plate adjustably mounted with respect to the baseplate, the guide plate having a cutout accepting the workpiece, the cutout at least partially positioned over the rods; and
    a measuring tool adjustably mounted with respect to the baseplate, and the measuring tool moving in a linear direction.

2. The apparatus of claim 1 wherein the wedge member comprises a screw having a tapered head.

3. The apparatus of claim 1 wherein the workpiece is positioned on top of the rods.

4. The apparatus of claim 1 wherein the rods each contact the channel along two linear points of contact.

5. The apparatus of claim 1 wherein the guide plate slides linearly with respect to the baseplate.

6. The apparatus of claim 5 wherein the guide plate is positioned over the top of the rods.

7. The apparatus of claim 1 wherein the measuring tool further comprises a measuring shaft having a longitudinal axis intersecting a centerline of the channel.

8. The apparatus of claim 1 wherein the cutout is formed in a wedge shape within the guide plate.

9. The apparatus of claim 1 wherein the rods extend above a planar surface of the baseplate.

10. The apparatus of claim 9 wherein the at least one wedge member is sunk below an exposed surface of each rod.

11. A method for measuring a dimension of a workpiece comprising the steps of:

mounting two rods within a channel of a baseplate;

securing at least one wedge member between the two rods and forcing the rods in a direction away from each other;

placing a workpiece on the rods within a guide plate at least partially positioned over the rods; and measuring a dimension of the workpiece with a measuring tool adjustably mounted with respect to the baseplate.

12. The method of claim 11 further comprising the additional step of sliding the measuring tool with respect to the baseplate.

13. The method of claim 11 further comprising the additional step of sliding the guide plate with respect to the baseplate.

* * * * *